United States Patent [19]

Shyr et al.

[11] Patent Number: 4,629,767

[45] Date of Patent: Dec. 16, 1986

[54] HYDROGENATION PROCESS AND CATALYST

[75] Inventors: Yen-Shin Shyr; Rex L. Bobsein; Marvin M. Johnson, all of Bartlesville, Okla.

[73] Assignee: Phillips Petroleum Co., Bartlesville, Okla.

[21] Appl. No.: 754,387

[22] Filed: Jul. 12, 1985

[51] Int. Cl.$^4$ .................................................. C08F 8/04
[52] U.S. Cl. .................................. 525/339; 525/333.7; 525/338
[58] Field of Search ................................ 525/338, 339

[56] References Cited

U.S. PATENT DOCUMENTS

| | | | |
|---|---|---|---|
| 1,997,135 | 4/1935 | De Mahler | 23/236 |
| 2,693,461 | 11/1954 | Jones . | |
| 2,864,809 | 12/1958 | Jones et al. | 260/85.1 |
| 2,975,160 | 3/1961 | Zelinski | 260/83.7 |
| 3,040,009 | 6/1962 | Wadsworth et al. | 260/82 |
| 3,535,271 | 10/1970 | Fuller | 252/452 |
| 3,536,632 | 10/1970 | Kroll et al. | 252/430 |
| 3,553,102 | 1/1971 | Rosinski | 208/111 |
| 3,554,911 | 1/1971 | Schiff | 252/59 |
| 3,692,701 | 9/1972 | Box | 252/466 B |
| 3,803,055 | 4/1974 | Reich . | |
| 3,868,332 | 2/1975 | Carter | 252/452 |
| 4,073,750 | 2/1978 | Yates | 252/459 |
| 4,145,298 | 3/1979 | Trepka | 252/51.5 A |
| 4,222,882 | 9/1980 | Brulet et al. | 252/51.5 A |

FOREIGN PATENT DOCUMENTS 2011911 7/1979 United Kingdom .

*Primary Examiner*—Joseph L. Schofer
*Assistant Examiner*—Bernard Lipman
*Attorney, Agent, or Firm*—A. W. Umphlett

[57] ABSTRACT

The hydrogenation of olefin polymers and especially diene polymers can be carried out effectively in a fixed bed mode of operation, preferably with up-flow of polymer solution, using a heterogeneous catalyst containing an active hydrogenation metal in which the catalyst support has defined surface area and pore volume characteristics and the hydrogenation metal or metal compound is incorporated into the support by impregnation with a non-aqueous solution of the metal or metal compound.

7 Claims, No Drawings

HYDROGENATION PROCESS AND CATALYST

This invention relates to improved hydrogenation catalysts and hydrogenation processes. In a further aspect, this invention relates to processes for producing hydrogenated polymers having a high degree of hydrogenation in the presence of a catalyst supported on a silica-containing material having defined surface area and pore volume characteristics. In accordance with still another aspect, this invention relates to polymer hydrogenation in an up-flow manner with a fixed-bed of heterogeneous catalyst in which the support has defined surface area and pore volume characteristics. In another aspect, this invention relates to the preparation of hydrogenation catalysts wherein a support as defined herein is impregnated with a non-aqueous solution of a suitable metal or metal compound.

In accordance with still another aspect, this invention relates to hydrogenation catalysts prepared by impregnation of a particulate silica-containing material having defined surface area and pore volume characteristics with a non-aqueous solution of a hydrogenation metal and activated at low activation temperatures in the presence of a reducing agent.

BACKGROUND OF THE INVENTION

The structural and engineering uses of polymeric materials continues to grow rapidly in areas as diverse and protective paint coverings, wire insulations, structural panels for automobiles and piping of all kinds. In such cases the stability of the polymer is of paramount importance. The hydrogenation of olefin polymers, and especially diene-containing polymers such as butadiene-styrene copolymers, and the like, yields substances of greater saturation and consequently greater stability when used for certain applications. Rheological additives, for example, viscosity index improvers, are one class of compounds produced by the saturation of diene polymers.

The prior art has been interested in and examined polymer hydrognation processes for many years (U.S. Pat. No. 2,8 64,809), as a method to prepare novel materials with some unusual properties. For the most part, the early processes emphasized heterogeneous catalysts commonly used for saturation of low molecular weight olefins and aromatics, such as the nickel on kieselguhr system. A fine catalyst powder was preferred and large amounts of catalysts were required to complete the hydrogenation in a reasonable time. Such processes were only partially successful, since the reaction requires the diffusion of large polymer molecules into the pores of the catalyst, where the active nickel metal is present. This is a slow process with large molecules. The discovery of the nickel octoate/tiethyl aluminum catalyst system led to rapid hydrogenation of the polymer dissolved in a saturated solvent. Such a process was used for a number of years to prepare hydrogenated butadiene-styrene polymers that are used as viscosity-index improvers in premium motor oils (U.S. Pat. No. 3,554,991). There are no pore diffusion problems with homogeneous catalysts and the hydrogenation process is rapid and complete in a matter of minutes. However, the removal of the catalyst from the polymer soluton requires the additon of an ammonium phosphate-water soluton and air to oxidize the nickel to a divalent state. The mixed nickel-aluminum phosphate can be removed from the hydrogenated polymer solution by filtration. Many of the advantages associated with the use of homogeneous hydrogenation catalyst systems are offset by the catalyst removal step (U.S. Pat. No. 3,531,448), particularly when disposal of the spent catalyst is considered as part of the operation. We and others have repeatedly looked for suitable olefin polymer hydrogenation catalysts, particularly catalysts that could be used in fixed bed reactors. Recently we have discovered a commercial material that is a suitable catalyst support for use in fixed bed reactors.

There is a continuing effort to develop improved hydrogenation catalysts and processes to selectively hydrogenate polymers, such as olefin polymers, and especially diene-containing polymers, to hydrogenated polymeric products having desirable properties. The present invention is directed to a catalyst system and process for hydrogenating olefin polymers, especially diene-vinyl aromatic copolymers, to form polymers having reduced unsaturation.

OBJECTS

In is one subject of the invention to provide a catalyst composition and system useful for the hydrogenation of olefin polymers.

It is still another object of this invention to provide a catalyst support for use in fixed bed hydrogenation of olefin polymers.

It is a further object of the present invention to provide an improved method of preparing heterogeneous catalysts.

It is another object of this invention to provide a process for the hydrogenation of olefin polymers in which a fixed-bed mode of contact is used in a more efficient manner.

Other objects, aspects and well as the several advantages of the invention will be apparent to those skilled in the art upon reading the specification and the appended claims.

SUMMARY OF THE INVENTION

According to the present invention, a process is provided for hydrogenation of olefin polymers which comprises contactng polymer in solution with gaseous or dissolved hydrogen in a fixed bed of heterogeneous solid particulate catalyst comprising solid particulate support having defined surface area and pore volume characteristics and having incorporated therein at least one metal active for hydrogenation formed by contacting support with non-aqueous solution containing one or more catalytic metals.

In accordance with one specific embodiment of the invention, the hydrogenation metal deposited on the heterogeneous catalyst support is applied as an alcoholic solution of at least one metal or metal compound.

In a further embodiment of the invention, a heterogeneous hydrogenation catalyst comprising silica having a surface area in the range of about 120–160 m$^2$/g (as measured by the BET/N$_2$ method, ASTM D 3037) and a pore volume of about 1.5–2.5 cc/gram (as measured by dibutylphthalate absorption, ASTM D 3493) and having deposited thereon a hydrogenation metal from an alcohol solution of the meta followed by reduction of the metal by contacting with a reducing gas at a relatively low temperature of at least about 200° C. to produce a catalyst active for hydrogenation of olefin polymers.

In another embodiment of the invention, it has been found that the most effective hydrogenation can be accomplished by upflow passage of polymer to be hydrogenated through a fixed bed of catalyst of the invention.

DETAILED DESCRIPTION OF THE INVENTION

In the discussion hereafter for simplicity and convenience we direct the invention as being applicable to olefin polymers, especially diene-containing polymers, but it should be understood that the invention is equally applicable to other unsaturated materials.

CATALYSTS

The hydrogenation catalyst of the invention comprise any of the Group VIII, Group VI(b), Group I(b), Group II(b) metals, and the like, known to be active for hydrogenation. Representative examples of suitable metal compounds that can be used to form the heterogeneous catalyst of the invention include ruthenium, rhodium palladium, iridium, platinum, nickel, cobalt, iron, chromium, copper, tin, zinc, and the like, as well as mixtures thereof. Nickel is presently preferred.

The support material is selected from the group consisting of refractory inorganic oxides that have defined surface area and pore volume characteristics set forth herein. For example, the surface area of the support should be at least about 100 $m^2/g$, and preferably in the range of about 120–160 $m^2/g$ (as measured by the BET/$N_2$ method, ASTM D 3037) and the pore volume as measured by absorption of dibutylphthalate (ASTM D 3493) ranges from about 1.5 to about 2.5 cc/gram. Specific examples of suitable support materials include precipitated silica, aluminum phosphate, and other inorganic refractory materials having a CTAB surface area of 100 $m^2/g$ or greater, and mixtures thereof. The most preferred support for use in preparing the catalyst of the invention is silica. One specific commercially available silica that can be used is Hi-sil 210, manufactured by PPG. This material is prepared by a precipitation technique that gives very fine spherical particles with an average diameter of 0.022 microns. The granules of this product are suited for use in fixed bed reactors.

The catalyst is prepared by forming a solution of a metal or metal compound in a non-aqueous solvent, such as an alcohol, combining the solution of metal with the support material, and removing solvent to obtain a composite of the support and metal or metal compound. Presently preferred diluents include the lower alkanols having up to about 5 carbon atoms, such as methanol, ethanol, propanol, and the like.

After impregnation of the support with non-aqueous solution of hydrogenation metal or metal component excess diluent is removed, the impregnated support is activated by reducing at an elevated temperature and for a period of time sufficient to convert substantially all of the metal to active metal. The activation step is carried out by contacting the composite with a reducing gas comprising hydrogen. The reducing gas can be conveniently diluted with an inert gas such as nitrogen. The temperatures at which the activation takes place are greater than about 100° C., Preferably, the activation temperature is in the range of about 150° C. to about 500° C., more preferably about 200° C. to about 400° C.

After activation the catalyst contains from about 2 to about 40 percent by weight metal, preferably, about 2 to about 20 percent by weight metal.

Presently preferred catalyst compositions for use according to the invention include nickel-silica, nickel-palladium-silica, nickel-copper-silica, and the like.

OLEFIN POLYMERS

The polymers or polymerized substrates to be hydrogenated in accordance with the invention are generally olefin polymers which can be either quenched or living polymers. Preferably the olefin polymer feeds are diene-containing polymers and copolymers with aromatic/diene copolymers highly preferred.

Useful diene moieties include any conventional poly-unsaturated monomers having from about 3 to about 12 carbon atoms. Butadiene is preferred. Useful aromatic monomers include mono- and polyvinyl substituted aromatic compounds. Styrene and divinyl benzene are are preferred, with styrene highly preferred. Mixtures of vinyl aromatic and/or diolefin monomers can be used, along with the optional inclusion of conventional olefinic monomers of other types, in the preparation of the polymeric substrate.

The relative quantities of aromatic and diene monomers used in preparing aromatic/diene copolymers for use as hydrogenation feeds herein will generally lie between about 10 weight percent and about 90 percent, with about 40 to about 75 preferred for aromatic monomers; and between about 10 percent and about 90 percent, with about 40 to 75 preferred for diene monomers. The optional inclusion of other monomers is also contemplated. Mixtures of polymeric substrates can be employed.

In accordance with another aspect of the invention, "living", e.g., Li-terminated, polymers are used as disclosed in U.S. Pat. No. 4,145,298, which is incorporated herein by reference. In that patent nitrogen-containing copolymers are prepared by the reaction of lithiated hydrogenated conjugated diene-monovinylarene copolymers with nitrogen-containing organic compounds.

The olefinic polymer, such as conjugated diene polymers, can be hydrogenated as such. Good results, however, can be obtained when the polymer is used in the form of a solution. The concentration of polymer in solution is usually about 1 to about 75 percent by weight, preferably about 1 to about 40 percent by weight. Any solvent which does not adversely affect the hydrogenation catalyst and can dissolve the polymer to be hydrogenated can be used to provide the polymer solution. Solvents that can be employed include benzene, toluene, xylenes, hexane, cyclohexane, acetone, methylethylketone, ethyl acetate, and the like, and mixtures thereof. Polymers prepared by solution polymerization can be used as such for hydrogenation.

HYDROGENATION CONDITIONS

The hydrogenation reaction is carried out using quantities of hydrogen necessary to react with significant numbers of the unsaturated bonds present in the polymeric substrate. Generally, hydrogenation of trans unsaturation, vinyl unsaturation, and styrene unsaturation will take place during the hydrogenation reaction. By "styrene unsaturation" applicants mean aromatic unsaturation present in the ring structure of any aromatic component, e.g., styrene. Typically, about 95% and preferably about 100%, of the olefinic (i.e., trans and vinyl) unsaturation will be hydrogenated, with about 5%, and preferably about 0%, of the aromatic unsaturation being hydrogenated as well.

Hydrogen or hydrogen-containing reactant(s) will be supplied to the reaction at pressures and other reaction conditions sufficient to cause hydrogenation of the materials being hydrogenated. Preferably, the hydrogenation reaction takes place at a temperature in the range of about 50°–200° C. and about 100–700 psig $H_2$ pressure over a period of about one half hour to about twelve hours. While hydrogen gas is a preferred source of hydrogen atoms for the reaction, other conventional hydrogen donors are operable herein. Mixtures of hydrogen sources can be employed.

The reaction vessel employed in the process of the invention is generally any vessel which will afford efficient contacting of catalyst composition with reactants, i.e., hydrogen source(s) and polymer substrate(s) to be used. Broadly, the temperature can range from about 50° to about 200° C. and the pressure can range from about 100 to about 700 psig. It is preferred to carry out the hydrogenation reaction in a fixed-bed reaction zone containing the supported heterogeneous hydrogenation catalyst with up-flow of polymer solution. The catalyst can be contacted either with a down-flow or up-flow passage of polymeric solution to be hydrogenated. It has been found that the up-flow process is preferred. The liquid hourly space velocity (LHSV) of the polymer solution can range from about 0.1 to about 1 cc/cc catalyst/hour, preferably about 0.3 to 0.6 cc/cc/hour.

The polymers of the invention can be hydrogenated directly in their normal non-viscous to viscous form, or they, as well as solid polymers, can be hydrogenated in the form of a solution or a dispersion in a suitable solvent which preferably is not hydrogenatable. In cases where the polymeric material is dissolved in a solvent, it is somewhat more economical to separate the polymeric material after hydrogenation and reuse the solvent. The hydrogenation is preferably carried out in a continuous process. When sufficient hydrogenation has been effected, usually as indicated by a decrease in unsaturation or a drop in hydrogen pressure, the reaction is stopped and the dispersion or solution treated by suitable means, such as by filtering, centrifuging, and the like, to remove the catalyst. The extent of hydrogenation of the olefinic bonds and of the phenyl groups in the polymers treated can be determined by infrared analysis before and after hydrogenation.

The following examples are presented in further illustration of the invention.

SPECIFIC EXAMPLES

Controlled hydrogenation of butadiene-styrene copolymer to reduce olefinic unsaturation only or to reduce also the aromatic components, and preparation of the catalyst that possess this selectively, are shown in the following examples.

Runs hydrogenating butadiene-styrene copolymer were made using a number of heterogeneous catalysts including commercial supports and finished catalysts. Pertinent information about catalyst preparation and compositions follow.

Catalyst A: 100 g Hi-Sil 210 silica pellets (from PPG Industries, Inc. BET/$N_2$ surface area: 140–160 $m^2$/g; moisture loss at 221° F.: 3–7 weight percent; pH of 5% water suspension: 6.5–7.3) that contained 0.35 weight percent sulfur, presumably as the sulfate, was impregnated with a solution of 49.6 g Ni($NO_3$)$_2$.6$H_2O$ in 600 mL methanol. Solvent was permitted to evaporate at ambient temperature. When reduced the catalyst contained 9.1 weight percent nickel.

Catalyst B: 100 g Hi-Sil 210 silica pellets (See Catalyst A) was impregnated with a solution of 99.2 g Ni($NO_3$)$_2$.6$H_2O$ in 600 mL methanol. Solvent was permitted to evaporate at ambient temperature. When reduced the catalyst contained 16.7 weight percent nickel.

Catalyst C: 10 g Hi-Sil 210 silica pellets (See Catalyst A) was impregnated with a solution of 4.96 g Ni($NO_3$)$_2$.6$H_2O$ in 600 mL methanol and 0.30 g Ni$SO_4$.6$H_2$ in 40 mL methanol. Solvent was removed in a drying oven. When reduced the catalyst contained 9.7 weight percent nickel.

Catalyst D: 100 g Hi-Sil 210 silica pellets (See Catalyst A) was impregnated with a solution of 49.6 g Ni($NO_3$)$_2$.6$H_2O$ in 600 mL methanol and 8.2 g Cu($NO_3$)$_2$.3$H_2O$ in 600 mL methanol. Solvent was permitted to evaporate at ambient temperature. When reduced the catalyst contained 8.9 weight percent nickel and 1.9 weight percent copper.

Catalyst E: 3 g Hi-Sil 210 silica pellets (See Catalyst A) was impregnated with 0.0067 g $PdCl_2$ dissolved in 20 mL methylene chloride. Solvent was permitted to evaporate at ambient temperature. When reduced the catalyst contained 0.13 weight percent palladium.

Catalyst F: 100 g Hi-Sil 210 silica pellets (See Catalyst A) was impregnated with 49.6 g Ni($NO_3$)$_2$.6$H_2O$ dissolved in water. Water was removed in a drying oven. When reduced the catalyst contained 9.1 weight percent nickel.

Catalyst G: This was a commercially prepared hydrocarbon catalyst that contained 60 weight percent nickel on kieselguhr. This catalyst had a surface area of 150 $m^2$/g, or pore volume (measured with water) of 0.20 cc/g, and an average bulk density of 1.67 g/cc.

Catalyst H: 20 g of Calsicat activated alumina was impregnated with a solution of 20 g Ni($NO_3$)$_2$.6$H_2O$ in 600 mL methanol. Solvent was removed in a drying oven. When reduced the catalyst contained 16.8 weight percent nickel.

Catalyst J: 100 g of Ketjen silica gel was impregnated with a solution of 99.1 g Ni($NO_3$)$_2$.6$H_2O$ in 600 mL methanol. Solvent was removed in a drying oven. When reduced the catalyst contained 16.7 weight percent nickel.

Catalyst K: 10 g of Ketjen activated alumina (a large pore catalyst support) was impregnated with 9.9 g Ni($NO_3$)$_2$.6$H_2O$ in 40 mL methanol. Solvent was removed in a drying oven. When reduced the catalyst contained 16.7 weight percent nickel.

EXAMPLE I

These catalysts were used in runs to hydrogenate a solution of butadiene-styrene copolymer ($M_n \approx 50,000$; butadiene content: 39 weight percent) at a concentration of 12.6 weight percent in cyclohexane. Polymers were analyzed for olefinic unsaturation by infra-red spectroscopy and for aromatic content by ultraviolet spectroscopy. Before being hydrogenated, analysis of the polymer showed 17.8 percent trans olefin, 10.3 percent vinyl olefin, and 60.8 percent styrene. Hydrogenation of cis and vinyl unsaturation proceeds more readily than of trans unsaturation. Runs were made using two different methods.

Flow runs were made in which the polymer solution was pumped through a fixed catalyst bed contained in a schedule 80 one-inch stainless steel pipe reactor 26 inches in length. Hydrogen flow rate was controlled with a fine metering valve. 160 mL of catalyst, supported on glass beads, was centered in the reactor, and catalyst temperature was measured with a moveable thermocouple in a thermowell centered in the reactor. Runs were made at 500 psig. Other conditions, and results of the hydrogenation runs, are recorded below.

Run 1: Catalyst D after being dried was calcined in air at 450° C. for 17 hours, then reduced in flowing hydrogen at 200° C. for 7 hours. Polymer solution was pumped upflow through the reactor at 0.12 LHSV, 160° C., with hydrogen added to the feed at 2.6 L/hr. Hydrogenated polymer had no olefinic unsaturation and only 1.5 percent styrene content.

Run 2: 160 mL of catalyst B was reduced at 500° C. for 5 hours, then placed into the pipe reactor. Polymer solution was pumped upflow during the initial period of the run and downflow during the final period. Hydrogen feed rate of 2.5–3 L/hr. was sought. Results of the hydrogenation are shown in Table I.

trans unsaturation in much shorter time than did catalyst F which was made with water solution.

EXAMPLE III

Runs were also made in a 300 mL stirred autoclave in which catalyst pellets at the bottom of the autoclave were covered with wire gauze that held them in place when the stirrer was on. All runs were made with 170 mL of polymer solution. A standardized procedure for preparing the autoclave was used. After adding catalyst and polymer solution the autoclave was closed, flushed twice by pressuring with hydrogen to 500 psig and venting, and finally adding hydrogen to 500 psig. The autoclave was maintained between 138°–149° C. during the run. The stirrer was started when reaction temperature had been attained. Table III summarizes pertinent run conditions and results of analyses of the hydrogena-

TABLE I

| Run | Flow Direction | Time of Reaction hr | Catalyst temp, °C. | Polymer Feed Rate, LHSV | H$_2$ Effluent rate, L/hr | Polymer Analyses % Unsaturation | | |
|---|---|---|---|---|---|---|---|---|
| | | | | | | Trans | Vinyl | Styrene |
| 1 Cat. D | Up | 75 | 149 | 0.58 | 0.42 | 2.5 | nil | 51.3 |
| 1 Cat. D | Up | 94 | 149 | 0.58 | 0.33 | 2.6 | nil | 52.0 |
| 2 Cat. B | Down | 68 | 149 | 0.38 | 0.25 | 5.9 | 3.3 | 53.8 |
| 2 Cat. B | Down | 98 | 149 | 0.36 | 1.10 | 4.8 | 2.6 | 51.3 |

Measured from time when flow in stated direction was started, i.e. initial period was upflow, final period downflow.

It is seen that in the upflow runs less olefinic unsaturation.

TABLE III

| Run | 5 | 6 | 7 | 8 | 9 | 10 | 11 | 12 |
|---|---|---|---|---|---|---|---|---|
| Catalyst | A (Invent.) | A (Invent.) | C (Invent.) | E (Invent.) | G (Control) | H (Control) | J (Control) | K (Control) |
| Wt. catalyst, g | 6.5 | 5.0 | 7.6 | 2.7 | 5 | 7.5 | 6.8 | 5 |
| Catalyst reduction, H$_2$ | 3 hr, 370° C. | 2.6 hr, 500° C. | 2.5 hr, 500° C. | 2 hr, 450° C. | 1 hr, 370° C. | 18 hr, 370° C. | 4 hr, 370° C. | 3 hr, 370° C. |
| Run duration, hrs. | 2 | 2 | 5.7 | 3 | 2.3 | 4 | 4 | 2.3 |
| Polymer analyses: | | | | | | * | ** | *** |
| % Trans Unsaturation | 5.0 | 8.3 | 5.0 | 2 | 17.9 | | | |
| % Vinyl Unsaturation | 0 | 3.4 | 2.3 | 0 | 10.4 | | | |
| % Styrene | 59.5 | 60.5 | 61.2 | 60.8 | 60.0 | | | |

*Polymer not analyzed. Hydrogen consumption about 10% of requirement to saturate olefinic groups in polymer.
**Polymer not analyzed. Hydrogen consumption about 5% of requirement to saturate olefinic groups in polymer.
***Polymer not analyzed. Hydrogen consumption about 9% of requirement to saturate olefinic groups in polymer.

tion in the polymer remained, thus indicating a higher rate of polymer hydrogenation than in the downflow runs despite a higher feed rate (i.e., shorter residence time) of polymer solution during the upflow operation.

EXAMPLE II

Runs 3 and 4 compare catalysts A and F which had the same composition but differed in the solvent used to impregnate the support with nickel nitrate. These catalysts were used to hydrogenate the same polymer as in Example I. Both catalysts were reduced with hydrogen for two hours at 500° C. before the runs. Results are shown in Table II.

TABLE II

| Run | 3 | 4 |
|---|---|---|
| Catalyst | A | F |
| Wt. catalyst, g | 7.6 | 5 |
| H$_2$ conversion rate-psi/g catalyst-hr. | 8.0 | 4.8 |
| Run duration, hr. | 5.7 | 17.3 |
| % trans in polymer | 5.0 | 5.8 |

Catalyst A, made from methanol, was more active for polymer hydrogenation and had saturated more of the Invention catalysts A, C, and E, which are representative examples of this invention, were used in runs 5–8 of Table II and possessed appreciably more activity for hydrogenating butadiene-styrene copolymer than did control catalyst G, as indicated by the considerably higher content of vinyl and trans unsaturation in the partially hydrogenated polymer obtained in control run 9. Control catalysts H, J and K were even less active than control catalyst G as indicated by the very low hydrogen consumption.

That which is claimed is:

1. A process for the hydrogenation of olefin polymers which comprises contacting olefin polymer in solution with hydrogen in a fixed bed of a heterogeneous metal hydrogenation catalyst in which (1) the catalyst particulate support has surface area of about 100–160 m$^2$/g as measured by the BET/N$_2$ method (ASTM D 3037) and pore volume as measured by absorption of dibutylphthalate (ASTM D 3493) of about 1.5 to about 2.5 cc/gram (2) the metal is incorporated into the support by impregnation with a non-aqueous solution of a suitable hydrogenation metal or hydrogenation metal compound and, (3) the impregnated catalyst is subsequently reduced and activated by contacting with hydrogen at a temperature in the range of about 150° to about 500° C.

to produce a catalyst containing about 2 to about 40 percent by weight metal which is active for hydrogenation of olefin polymers.

2. A process according to claim 1 wherein said hydrogenation metal is one of nickel, copper and palladium and said support is silica which has a surface area of about 120–160 m$^2$/g.

3. A process according to claim 1 wherein the metal is incorporated into the support with a lower alkanol solution of a hydrogenation metal or metal compound.

4. A process according to claim 1 wherein the polymer solution is passed in a upflow manner through a fixed bed of catalyst.

5. A process according to claim 4 wherein the olefin polymer is a butadiene/styrene copolymer.

6. A process according to claim 1 wherein at least a portion of the hydrogenated product removed from hydrogenation is recycled as part of the feed to the hydrogenation.

7. A process according to claim 1 wherein said catalyst is activated at a temperature in the range of about 200° C. to about 400° C.

* * * * *